United States Patent
Hayashi et al.

(10) Patent No.: US 8,997,915 B2
(45) Date of Patent: Apr. 7, 2015

(54) WHEEL LOADER

(71) Applicant: Komatsu Ltd., Tokyo (JP)

(72) Inventors: Daisuke Hayashi, Komatsu (JP); Nobuo Matsuyama, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/115,364

(22) PCT Filed: Apr. 26, 2013

(86) PCT No.: PCT/JP2013/062371
§ 371 (c)(1),
(2) Date: Nov. 4, 2013

(87) PCT Pub. No.: WO2014/064956
PCT Pub. Date: May 1, 2014

(65) Prior Publication Data
US 2014/0196974 A1    Jul. 17, 2014

(30) Foreign Application Priority Data

Oct. 26, 2012 (JP) .................................. 2012-237064

(51) Int. Cl.
*B60K 13/04* (2006.01)
*F01N 3/24* (2006.01)
*E02F 9/08* (2006.01)

(52) U.S. Cl.
CPC . *B60K 13/04* (2013.01); *F01N 3/24* (2013.01); *E02F 9/0833* (2013.01); *E02F 9/0841* (2013.01); *E02F 9/0866* (2013.01)

(58) Field of Classification Search
USPC ........... 180/309, 89.2, 311, 296; 60/295, 297; 248/637, 678, 676, 677, 671
See application file for complete search history.

(56) References Cited

U.S. PATENT DOCUMENTS 5,832,726 A  * 11/1998 Rees et al. ...................... 60/322
7,967,094 B2 *  6/2011 Matsushita et al. ........ 180/89.17
(Continued)

FOREIGN PATENT DOCUMENTS

| CN | 101450349 A | 6/2009 |
| JP | 2011-529538 A | 12/2011 |

(Continued)

OTHER PUBLICATIONS

The Office Action for the corresponding Chinese application No. 201380001267.6, issued on Nov. 28, 2014.

(Continued)

*Primary Examiner* — J. Allen Shriver, II
*Assistant Examiner* — James M Dolak
(74) *Attorney, Agent, or Firm* — Global IP Counselors, LLP

(57) ABSTRACT

A wheel loader includes a vehicle frame, an engine, an operating fluid tank, a stand, a rear support frame, and a base member. The engine is mounted on the vehicle frame. The operating fluid tank is disposed in front of the engine. The stand is fixed to the vehicle frame and supports the operating fluid tank. The rear support frame is disposed facing the stand with the engine interposed there-between and fixed to the vehicle frame. The base member is disposed above the engine and has one end fixed to an upper part of the stand and the other end fixed to an upper part of the rear support frame. A diesel particular filter, a nitrogen oxide reduction catalytic converter, and a connecting pipe are all mounted on the base member with the connecting pipe connecting the diesel particulate filtering device and the nitrogen oxide reduction catalytic converter.

9 Claims, 12 Drawing Sheets

(56) References Cited

U.S. PATENT DOCUMENTS

| | | |
|---|---|---|
| 8,191,668 B2 | 6/2012 | Keane et al. |
| 8,365,518 B2 * | 2/2013 | Ezawa et al. .................... 60/297 |
| 8,403,099 B2 * | 3/2013 | Yokota ......................... 180/309 |
| 8,407,991 B2 * | 4/2013 | Yokota ........................... 60/297 |
| 8,418,448 B2 * | 4/2013 | Kamata et al. ................. 60/322 |
| 8,459,014 B2 * | 6/2013 | Kamiya et al. ................. 60/295 |
| 8,516,807 B2 * | 8/2013 | Kosaka et al. .................. 60/297 |
| 8,549,847 B2 * | 10/2013 | Kamiya et al. ................. 60/299 |
| 8,573,646 B2 * | 11/2013 | Kamiya ....................... 180/89.2 |
| 8,820,691 B2 * | 9/2014 | Bednarz et al. .......... 248/295.11 |
| 8,851,224 B2 * | 10/2014 | Hayashi et al. ............... 180/309 |
| 2010/0018732 A1 | 1/2010 | Daniel et al. |
| 2010/0186394 A1 * | 7/2010 | Harrison et al. ................ 60/299 |
| 2012/0247861 A1 | 10/2012 | Mizuno et al. |

FOREIGN PATENT DOCUMENTS

| | | |
|---|---|---|
| JP | 2012-184602 A | 9/2012 |
| WO | 2011/152306 A1 | 12/2011 |

OTHER PUBLICATIONS

International Search Report for PCT/JP2013/062371, issued on Aug. 6, 2013.

* cited by examiner

US 8,997,915 B2

WHEEL LOADER

CROSS-REFERENCE TO RELATED APPLICATIONS

This application is a U.S. National stage application of International Application No. PCT/JP2013/062371, filed on Apr. 26, 2013. This U.S. National stage application claims priority under 35 U.S.C. §119(a) to Japanese Patent Application No. 2012-237064, filed in Japan on Oct. 26, 2012, the entire contents of which are hereby incorporated herein by reference.

BACKGROUND

1. Field of the Invention

The present invention relates to a wheel loader, and in particular to the wheel loader equipped with an exhaust gas post-processing device such as a diesel particulate filtering device.

2. Background Information

An exhaust gas post-processing device is mounted on a wheel loader. The exhaust gas post-processing device includes a diesel particulate filtering device that collects and removes particulate matter of soot and the like included in the diesel engine exhaust. The diesel particulate filtering device is mounted in a row with an air cleaner on an upper portion of the engine. A nitrogen oxide reduction catalytic converter may also be provided to remove NOx from the exhaust gas. The nitrogen oxide reduction catalytic converter is provided on the exhaust downstream side of the diesel particulate filtering device.

As described above, the diesel particulate filtering device is mounted on an upper portion of the engine with an air cleaner and supported directly by the engine. Therefore, when a nitrogen oxide reduction catalytic converter is added, the nitrogen oxide reduction catalytic converter is provided on the upper portion of the engine on the exhaust downstream side of the diesel particulate filtering device.

However, when the nitrogen oxide reduction catalytic converter is mounted on the engine in addition to the diesel particulate filtering device, the combined weight of the devices becomes very large and the center of gravity of the engine becomes higher. As a result, engine vibration increases which is undesirable.

Accordingly, as described in U.S. Pat. No. 8,191,668, a configuration has been proposed in which a mounting mechanism is provided on a vehicle frame and the diesel particulate filtering device and the nitrogen oxide reduction catalytic converter are mounted on the mounting mechanism. The lower end of the mounting mechanism is fixed to the vehicle frame. The mounting mechanism has four posts that extend upward above the engine and an openable and closable base frame is provided on the four posts.

SUMMARY

As described in U.S. Pat. No. 8,191,668, the four posts normally need to be made longer to allow the exhaust gas post-processing to be disposed above the engine. However, a heavy object is loaded on the long posts in such a structure and thus vibration of the exhaust gas post-processing device cannot be sufficiently suppressed. There is also a risk that the strength of the posts may not be sufficient. If a structure in which the posts are strengthened is used, the thickness of the posts needs to be increased. As a result, a longer space for installing the exhaust gas post-processing device becomes necessary especially in the front-back direction.

An object of the present invention is to be able to suppress vibration of the exhaust gas post-processing device with a simple mechanism with great strength in a wheel loader in which the exhaust gas post-processing device is disposed above the engine.

A wheel loader according to a first aspect of the present invention comprises a vehicle frame, an engine mounted on the vehicle frame, an operating fluid tank disposed in front of the engine, a stand, a rear support frame, a base member, a diesel particulate filtering device and a nitrogen oxide reduction catalytic converter, and a connecting pipe that connects the diesel particulate filtering device and the nitrogen oxide reduction catalytic converter. The diesel particular filtering device, the nitrogen oxide reduction catalytic converter, and the connecting pipe are mounted on the base member. The stand is fixed to the vehicle frame and supports the operating fluid tank. The rear support frame is disposed facing the stand with the engine interposed therebetween, and is fixed to the vehicle frame. The base member is disposed above the engine and one end thereof is fixed to an upper portion of the stand and the other end thereof is fixed to an upper portion of the rear support frame.

The operating fluid tank in the wheel loader is disposed between a cab in which is provided an operating cabin, and an engine room that contains the engine. The operating fluid tank is supported on the stand fixed to the vehicle frame. The stand has high stiffness and strength since the operating fluid tank filled with operating fluid is very heavy.

The stand that supports the operating fluid tank is used to support the diesel particulate filtering device, the nitrogen oxide reduction catalytic converter, and the connecting pipe that connects the two devices in the present invention. Specifically, the rear support frame is provided to face the stand and the base member is provided above the engine between the stand and the rear support frame, and the diesel particulate filtering device and the like is mounted on the base member.

Since the stand for the operating fluid tank that is conventionally provided in the wheel loader is used to support the diesel particulate filtering device and the like, vibration of the engine and the diesel particulate filtering device and the like can be suppressed more in comparison to a case in which the diesel particulate filtering device and the like is supported by the engine. Further, the supporting mechanism of the diesel particulate filtering device and the like is a simple configuration and is very strong due to the same reason. In particular, the length in the front-back direction can be suppressed in the present invention since there is no need to provide a new supporting member at the front side.

A wheel loader according to a second aspect of the present invention is related to the wheel loader of the first aspect, wherein the rear support frame has left and right posts, an upper brace, and a rear supporting portion. The left and right posts are disposed facing each other in the crosswise direction of the vehicle. The upper brace extends in the crosswise direction of the vehicle and both ends thereof are fixed to the upper portions of the left and right posts. The rear supporting portion is provided so as to project upward in the middle portion of the upper brace in the crosswise direction, and supports the rear end portion of the base member. Spaces for disposing members are secured above the upper brace to the left and right of the rear supporting portion.

Here, the member disposition space is secured on an upper portion of the rear support frame. As a result, the member disposition space can be used for disposing piping for a cooling unit disposed in the rear portion of the vehicle and for an exhaust pipe for the diesel particulate filtering device.

A wheel loader according to a third aspect of the present invention is related to the wheel loader of the first and second aspects, wherein the base member is able to be removed from the stand and the rear support frame. The wheel loader further comprises a pipe unit connected between an exhaust portion of the engine and an exhaust gas inlet of the diesel particulate filtering device, and an adjusting mechanism for adjusting an assembly position of the pipe unit and the diesel particulate filtering device mounted on the base member.

The base member can be removed from the stand and the rear support frame, and therefore a sub-unit consisting of the diesel particulate filtering device and the like mounted on the base member can be removed from and assembled onto the stand and the rear support frame in the state of the sub-unit. Further, the engine side and the diesel particulate filtering device side are connected by the pipe unit.

When installing the sub-unit to the pipe unit previously connected to the engine side, the positions of the pipe unit and the diesel particulate filtering device in the sub-unit may not match.

Therefore, the wheel loader of the third aspect is provided with an adjusting mechanism for adjusting the positional relationships of both devices. The installation of the engine and the diesel particulate filtering device can be conducted smoothly by adjusting the positional relationships of both devices.

A wheel loader according to a fourth aspect of the present invention is related to the wheel loader of the third aspect, wherein the pipe unit has an upstream side pipe and a downstream side pipe. An end portion on the exhaust upstream side of the upstream side pipe is connected to the exhaust portion of the engine and extends rearward from the exhaust upstream side end portion, and the exhaust downstream side bends upward and is formed so that an end portion of the exhaust downstream side opens upward. The downstream side pipe has a first pipe section that is connected to the exhaust gas inlet of the diesel particulate filtering device, and a second pipe section that forms a certain angle with the first pipe section and is connected to the exhaust downstream side end portion of the upstream side pipe.

The pipe unit is configured by the upstream side pipe and the downstream side pipe. As a result, an installation error between the engine side and the diesel particulate filtering device side can be absorbed in the linkage of both pipes. In particular, since the downstream side pipe is a so-called elbow pipe, the allowable range of installation errors in the lateral and longitudinal directions can be broadened. Further, since the elbow pipe is used, projection of the downstream side pipe rearward can be suppressed.

A wheel loader according to a fifth aspect of the present invention is related to the wheel loader of the fourth aspect, wherein the upstream side pipe has a flexible pipe section.

The diesel particulate filtering device is supported by the stand and the rear support frame. As a result, the engine and the diesel particulate filtering device vibrate with separate vibration systems.

Accordingly, in the wheel loader of the fifth aspect, the flexible pipe section of the pipe unit that connects the engine and the diesel particulate filtering device is provided and a difference in the vibration of the engine and the diesel particulate filtering device is absorbed by the flexible pipe section.

A wheel loader according to a sixth aspect of the present invention is related to any of the wheel loaders of the second to fifth aspects, wherein the stand has a mounting surface on which the operating fluid tank is mounted, and a front supporting portion that projects upward in a middle portion in the crosswise direction of the vehicle at a rear end portion of the mounting surface to support the base member. The diesel particulate filtering device and the nitrogen oxide reduction catalytic converter are disposed in a row. One of the diesel particulate filtering device and the nitrogen oxide reduction catalytic converter is supported on the front end portion of the base member, and the other of the diesel particulate filtering device and the nitrogen oxide reduction catalytic converter is supported on the rear end portion of the base member.

The diesel particulate filtering device and the nitrogen oxide reduction catalytic converter are disposed on the front end portion and the rear end portion of the base member, that is, the portions supported by the front supporting portion and the rear supporting portion. In this way, since the diesel particulate filtering device and the nitrogen oxide reduction catalytic converter are disposed near the supporting portions, vibration from the diesel particulate filtering device and the nitrogen oxide reduction catalytic converter can be suppressed.

A wheel loader according to a seventh aspect of the present invention is related to the wheel loader of the sixth aspect, wherein the exhaust gas inlet of the diesel particulate filtering device is formed to face toward the rear. The pipe unit is disposed so as to pass through the member disposition space.

The diesel particulate filtering device of the wheel loader of the seventh aspect has an exhaust gas inlet facing toward the rear. Therefore, the pipe unit to which one end of the exhaust portion of the engine is connected needs to extend once to the rear of the diesel particulate filtering device to be connected from the rear to the diesel particulate filtering device. That is, the pipe unit needs to be arranged as far as the rear of the rear support frame. Accordingly, the pipe unit is arranged by using the member disposition space provided in the rear support frame.

By effectively using the space formed on the rear support frame, a space for disposing the pipe unit can be made smaller.

A wheel loader according to an eighth aspect of the present invention is related to the wheel loader of the second to seventh aspects, and further comprises a shim for height adjustment disposed between the base member and the rear supporting portion of the rear support frame.

The height of the diesel particulate filtering device can be easily adjusted by using the shim. Therefore, an installation error between the engine side and the diesel particulate filtering device side can be absorbed.

A wheel loader according to a ninth aspect of the present invention is related to the wheel loader of the eighth aspect, wherein the base member has an opening for avoiding obstruction with a fixed member for fixing the shim in the rear supporting portion.

The base member can be attached or detached in a state in which the shim is fixed to the rear supporting portion. Therefore, the shim is prevented from falling from the rear supporting portion when attaching or detaching the base member on which the diesel particulate filtering device is mounted.

In the present invention as described above, the vibration of the diesel particulate filtering device can be suppressed with a simple and strong mechanism in the wheel loader in which the diesel particulate filtering device is disposed above the engine.

DETAILED DESCRIPTION OF EMBODIMENTS

Figure 1:
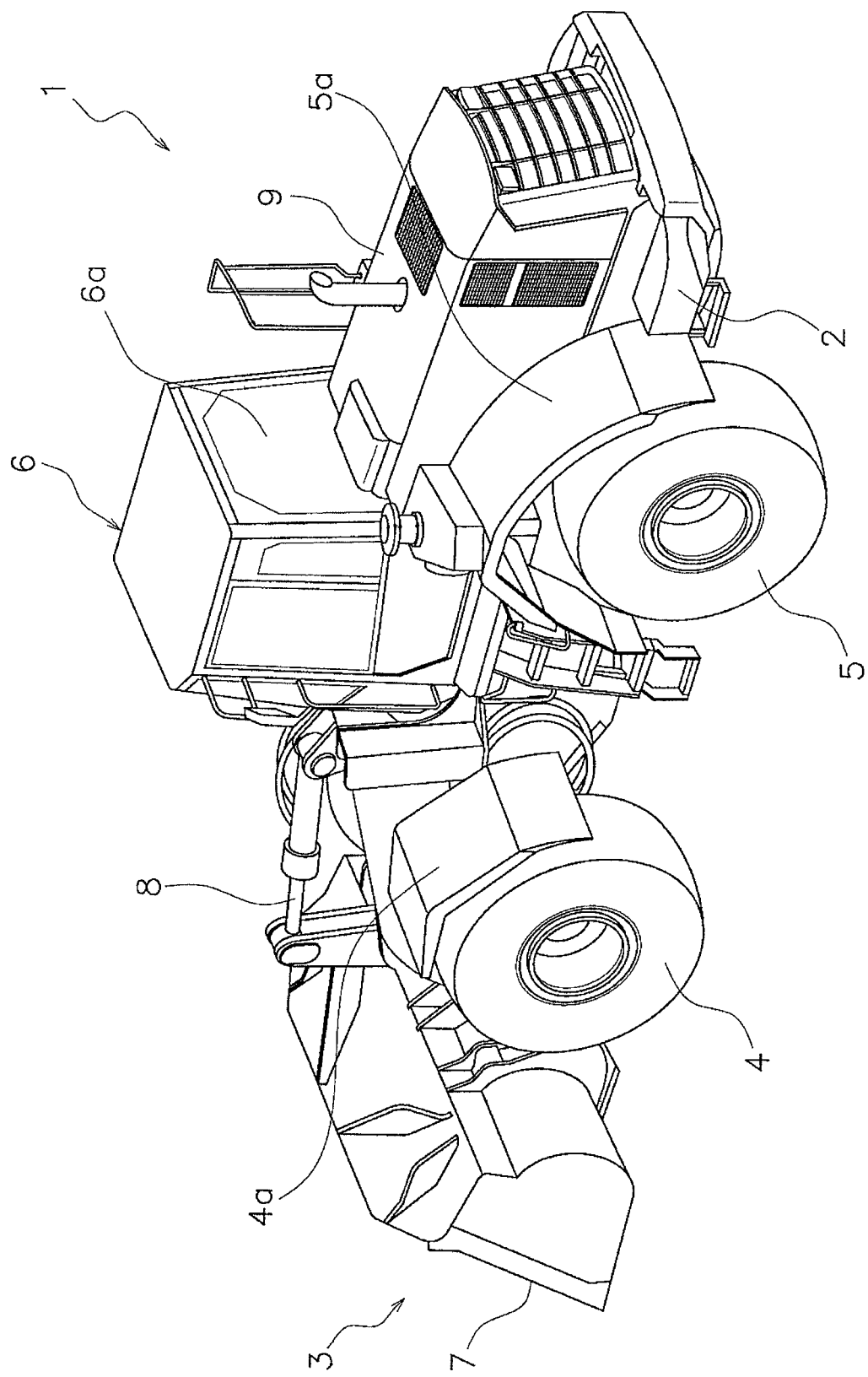
FIG. 1 is an external perspective view of a wheel loader according to an embodiment of the present invention.
Figure 2:
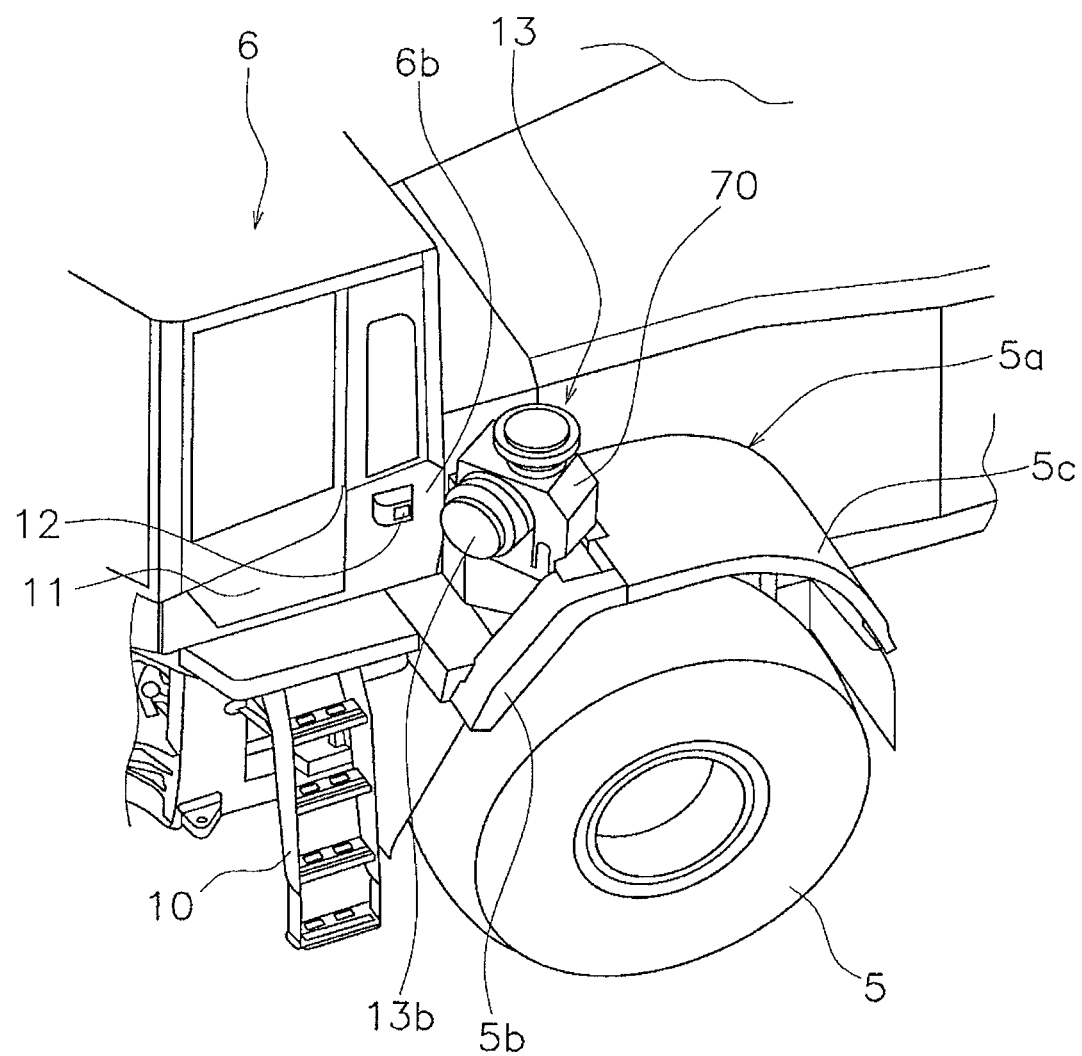
FIG. 2 is an external perspective partial view from the left front of the wheel loader of FIG. 1.

FIG. 1 illustrates an external perspective view of a wheel loader according to an embodiment of the present invention. FIG. 2 illustrates a portion of the wheel loader on the left side of the cab.

In the following explanation, "front" refers to the front of the vehicle and "rear" refers to the rear of the vehicle. "Left" and "right" refer respectively to the left and right of the vehicle looking toward the front of the vehicle.

Overall Configuration

A wheel loader 1 includes a vehicle body frame 2, working equipment 3, front wheels 4, rear wheels 5, and a cab 6. The wheel loader 1 is capable of traveling due to the rotation of the front wheels 4 and the rear wheels 5, and desired work can be conducted using the working equipment 3.

The vehicle body frame 2 includes a front body portion and a rear body portion which are connected to each other to allow for pivoting in the crosswise direction. The working equipment 3 and the front wheels 4 are provided on the front body portion. The rear wheels 5 and the cab 6 are provided on the rear body portion. The working equipment 3 is disposed at the front of the front body portion and includes a bucket 7, a bucket cylinder 8 and the like. Fenders 4a, 5a are respectively provided above and to the rear of the front wheels 4 and the rear wheels 5. An operating cabin 6a and various operating members and an operating panel are provided inside the cab 6.

As illustrated in FIG. 2, steps 10 for ascending to and descending from the cab 6 are provided on the left side of the cab 6. The steps 10 are disposed in front of the rear wheel fender 5a. A door 11 is provided in the cab 6 with the rear thereof supported by a hinge on the cab body 6b and the front thereof being openable and closable. The maximum degree of opening of the door 11 is limited by a stopper 12 provided on the outside of the cab body 6b. An air cleaner 13 is disposed on an upper portion of the rear wheel fender 5a on the left side while a detailed explanation is provided below. Foreign matter in the air drawn into the engine 15 is removed and the air is purified by the air cleaner 13.

Figure 3:
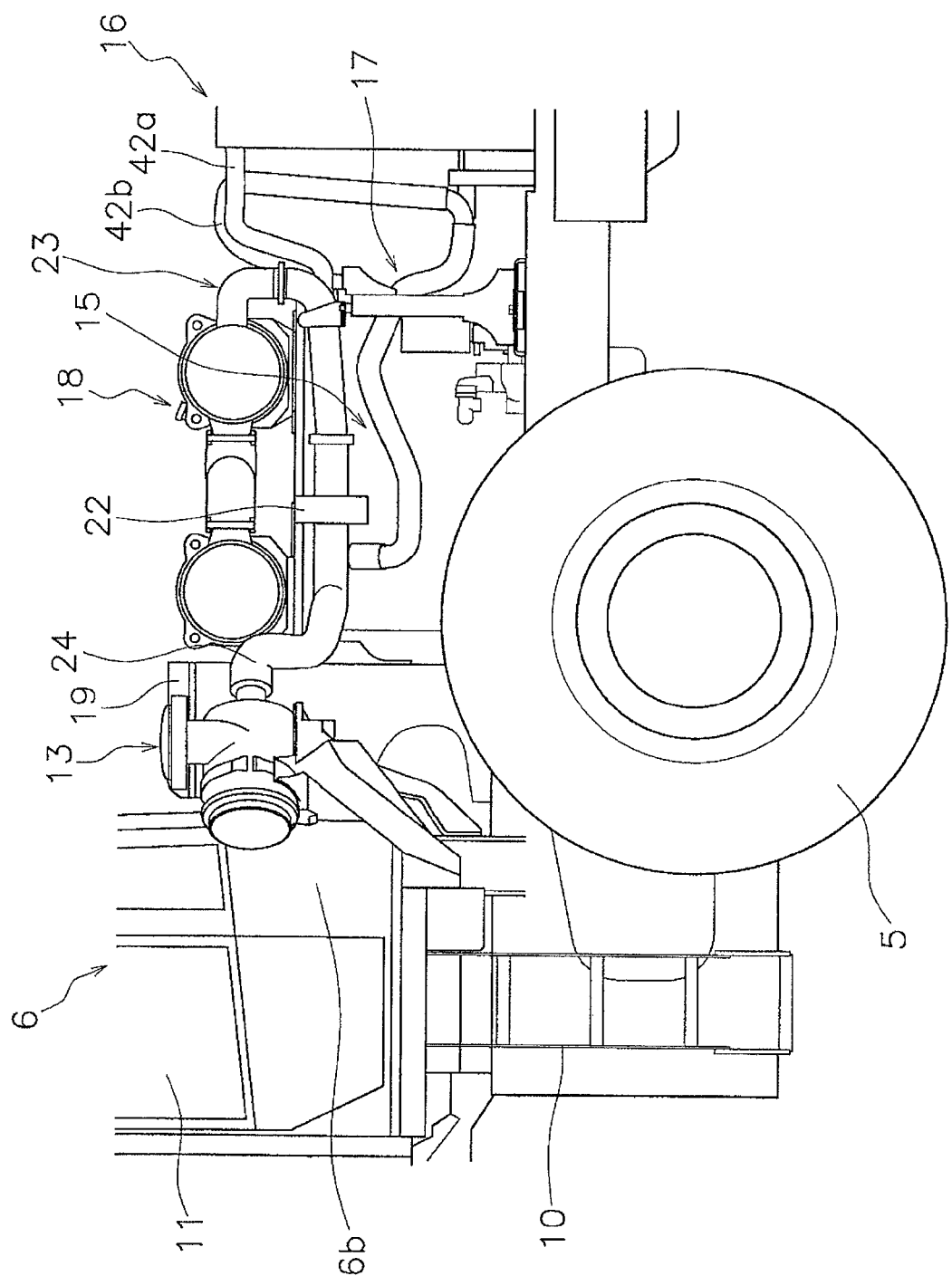
FIG. 3 is a side partial view with the vehicle body cover of the wheel loader of FIG. 1 removed.

FIG. 3 is a view of the rear body portion as seen from the left side of the vehicle with a vehicle body cover 9 (FIG. 1) to the rear of the cab 6 removed. As illustrated in FIG. 3, the engine 15, a cooling unit 16 disposed to the rear of the engine 15, a supporting mechanism 17, and an exhaust gas post-processing device 18 mounted on the supporting mechanism 17 above the engine 15 are disposed in a rear portion of the rear body portion. An operating fluid tank 19 is disposed between the cab 6 and the engine 15.

Figure 4:
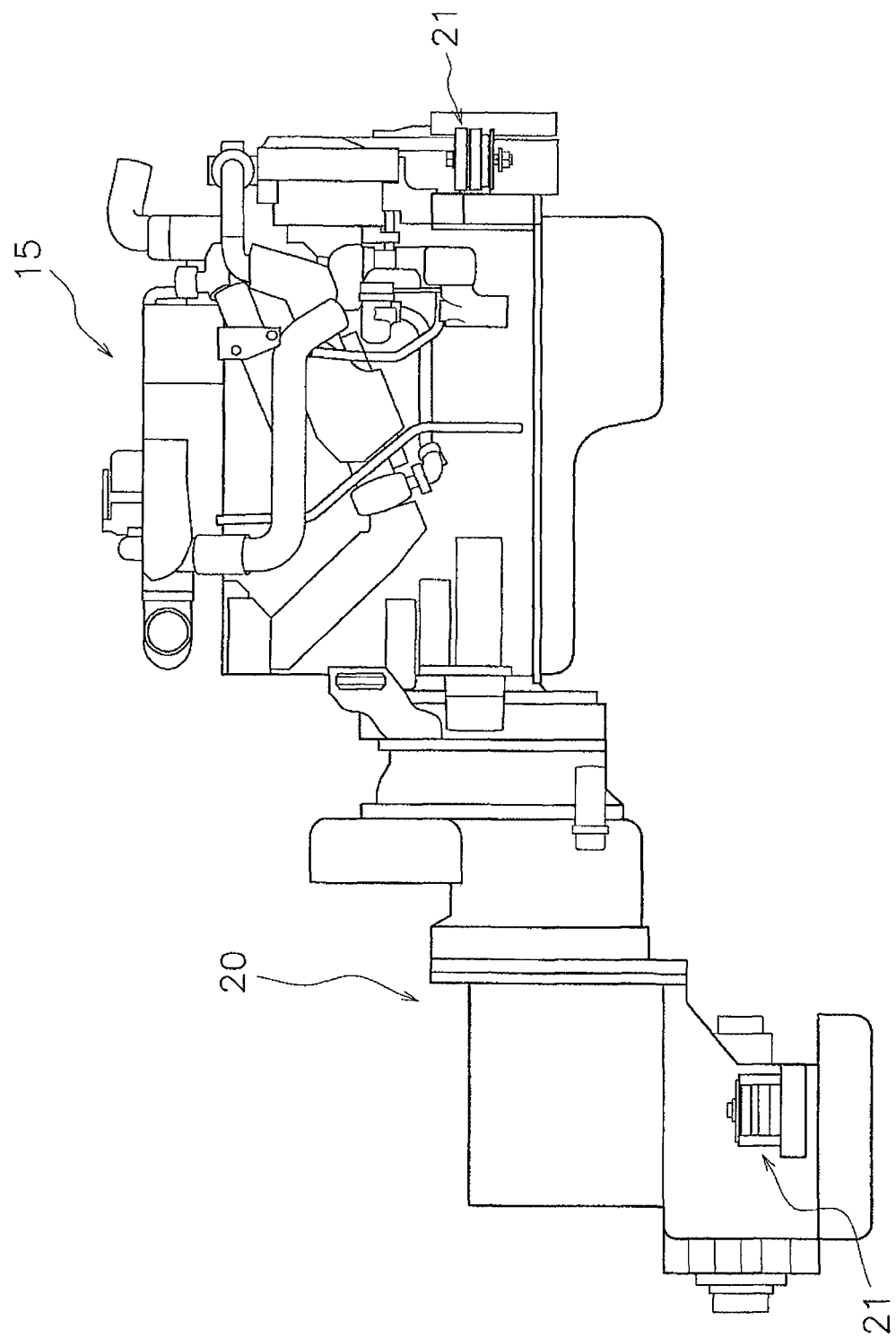
FIG. 4 illustrates a mounted state of an engine and a transmission.

The engine 15 is a so-called longitudinal mounted engine and is disposed so that a crankshaft extends in the front-back direction. The engine 15 is fixed to a transmission 20 with bolts to form an integrated structure as illustrated in FIG. 4. The engine 15 and the transmission 20 are supported in four locations on the vehicle body frame 2 via rubber mounts 21 in four locations.

As illustrated in FIG. 3, a turbo charger 22 that supercharges air by exhaust gas is provided on the left side of the engine 15. The turbo charger 22 is provided so that an exhaust gas outlet faces to the rear. A pipe unit 23 is provided between the turbo charger 22 and the exhaust gas post-processing device 18. A flexible intake pipe 24 made of rubber or plastic is provided between the turbo charger 22 and the air cleaner 13. A difference in vibration between the engine 15 and the air cleaner 13 is absorbed by the intake pipe 24.

Supporting Mechanism 17

Figure 5:
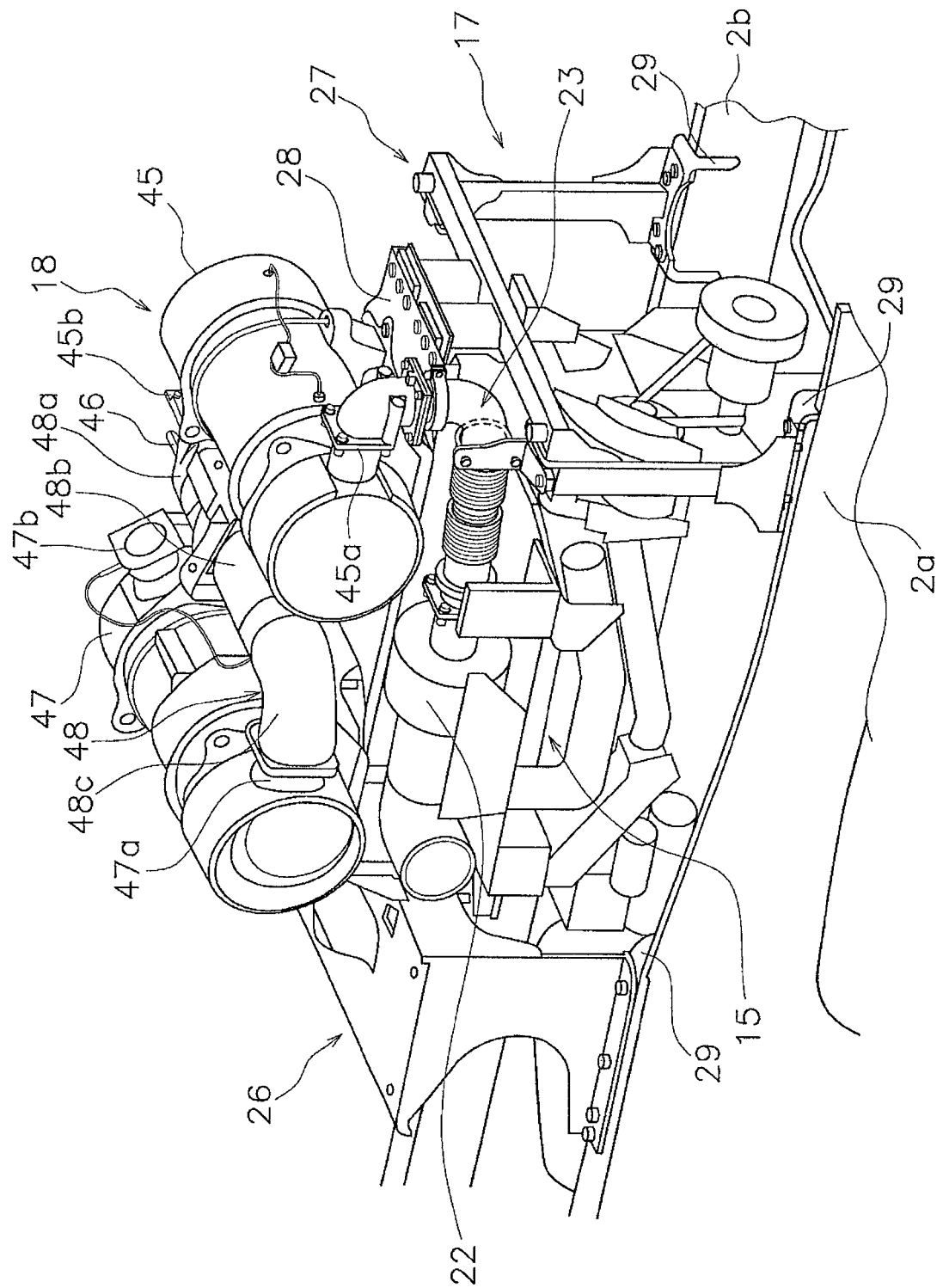
FIG. 5 is a perspective view illustrating an exhaust gas post-processing device and a supporting mechanism.
Figure 6:
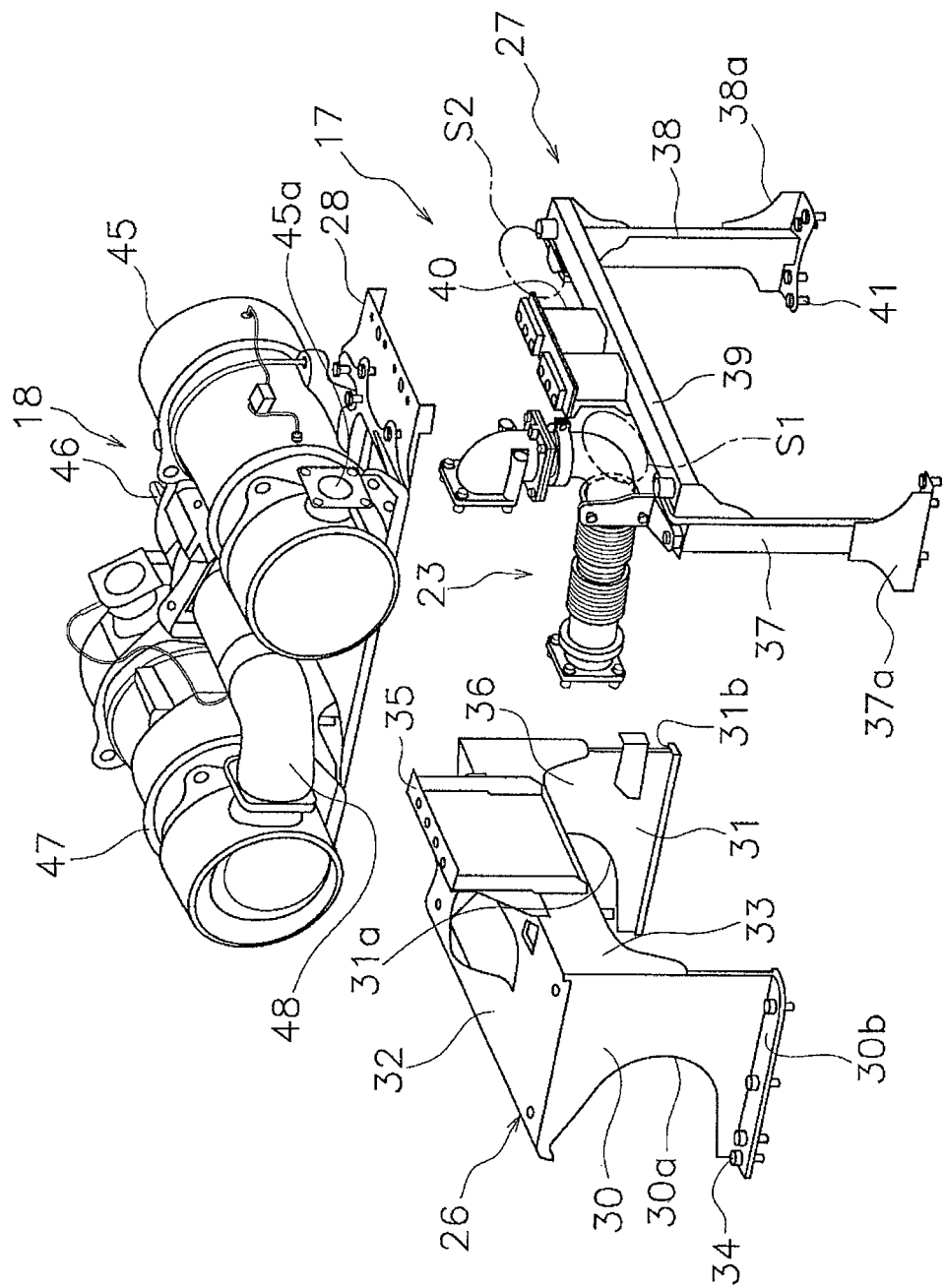
FIG. 6 is an exploded perspective view of the supporting mechanism.

FIG. 5 is a perspective view of a portion of FIG. 3 as seen from the rear. FIG. 6 is a perspective view illustrating the supporting mechanism 17 in a disassembled state. As illustrated in FIGS. 5 and 6, the supporting mechanism 17 is fixed directly to the vehicle body frame 2 with bolts and is configured by a front supporting frame 26 (one example of a stand), a rear supporting frame 27, and a base plate 28. More specifically as illustrated in FIG. 5, side frames 2a, 2b that extend in the front-back direction are provided respectively on the left and right sides of the rear body portion. Brackets 29 are provided in the front and back of the left and right side frames 2a, 2b and the front supporting frame 26 and the rear supporting frame 27 are fixed to the brackets 29.

The front supporting frame 26 includes left and right side portions 30, 31, a top plate portion 32, and a connecting portion 33. Front portions of the left and right side portions 30, 31 are formed in a rectangle shape and respectively have substantially semi-circular notched portions 30a, 31a. Plates of the left and right side portions 30, 31 have attachment portions 30b, 31b formed at the lower ends thereof to extend to the outside. The attachment portions 30b, 31b are fixed with a plurality of bolts 34 to the brackets 29 provided on the inside of the left and right side frames 2a, 2b. The top plate portion 32 is provided to connect the upper portions of the left and right side portions 30, 31. The operating fluid tank 19 is mounted on the upper surface of the top plate portion 32. That is, the front supporting frame 26 also acts as a base to support the operating fluid tank 19. The connecting portion 33 connects the rear portions of the left and right side portions 30, 31. The center portion in the crosswise direction of the connecting portion 33 projects further upward than the upper surface of the top plate portion 32 to form a front supporting portion 35. The width in the crosswise direction of the front supporting portion 35 is formed to be narrower than the width in the crosswise direction of the top plate portion 32.

The rear supporting frame 27 includes left and right posts 37, 38, a top beam 39, and a rear supporting portion 40. The left and right posts 37, 38 respectively include attachment portions 37a, 38a at the lower ends thereof. The attachment portions 37a, 38a are substantially triangular as seen from the side and the lower ends thereof are formed to extend toward the inside. The portions extending toward the inside are fixed with a plurality of bolts 41 to the brackets 29 provided on the inside of the left and right side frames 2a, 2b. The top beam 39 connects the upper portions of the left and right posts 37, 38, and the rear supporting portion 40 is provided in the center portion in the crosswise direction of the top beam 39. The rear supporting portion 40 projects further upward than the top beam 39 and is formed to be at the same height as the front supporting portion 35 of the front supporting frame 26.

Since the rear supporting portion 40 projects upward further than the top beam 39 and the width in the crosswise direction is shorter than the top beam 39 in the rear supporting frame 27 as described above, spaces S1, S2 for disposing members are formed in the crosswise direction of the rear supporting portion 40. In the present embodiment, a portion of the pipe unit 23 and the pipes 42a, 42b connected to a cooling unit 16 are disposed so as to use the spaces S1, S2 as illustrated in FIG. 3.

The base plate 28 is provided between the front supporting portion 35 of the front supporting frame 26 and the rear supporting portion 40 of the rear supporting frame 27. The base plate 28 is formed to have a rectangular shape and the width in the crosswise direction is substantially the same as the widths of the front supporting portion 35 and the rear supporting portion 40.

Figure 7:
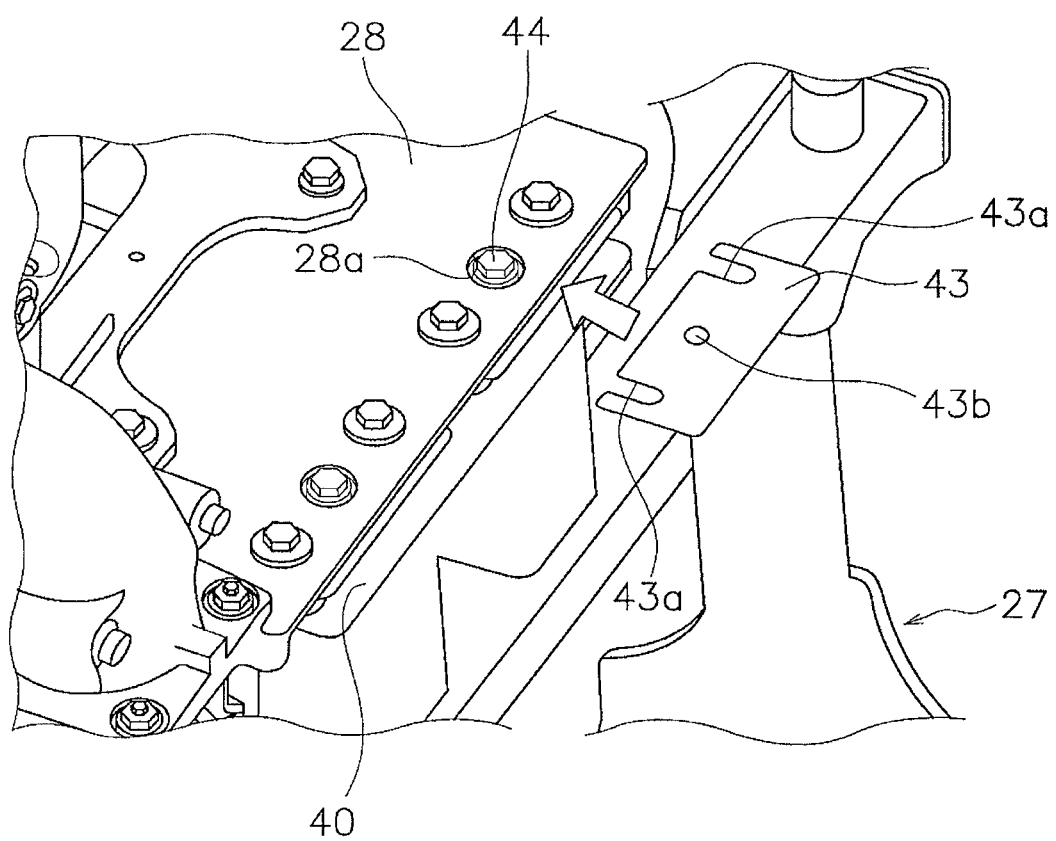
FIG. 7 illustrates a shim attached to the supporting mechanism.

As illustrated in FIG. 7, a shim 43 can be mounted in two locations in the crosswise direction between the bottom surface of the base plate 28 and the top surface of the rear supporting portion 40 of the rear supporting frame 27 (only one is illustrated in FIG. 7). The shim 43 is used for adjusting the height of the exhaust gas post-processing device 18 and the pipe unit 23 when the base plate 28 upon which is mounted the exhaust gas post-processing device 18 is fixed to the rear supporting portion 40 of the rear supporting frame 27. The shim 43 is rectangular and has a pair of notches 43a that open to one side at both ends in the crosswise direction, and a through hole 43b located between the pair of notches 43a.

The shim 43 is fixed to the top surface of the rear supporting portion 40 by a bolt 44. A large hole 28a with a diameter greater than the head of the bolt 44 is formed in the base plate 28 in the location where the bolt 44 is provided. Obstruction between the base plate 28 and the bolt 44 can be avoided as a result of the hole 28a. Therefore, the base plate 28 can be attached or detached with the shim 43 fixed to the rear supporting portion 40.

The shim 43 can be prepared in various thicknesses or one or a plurality of shims 43 can be used in combination to allow the height to be adjusted.

Exhaust Gas Post-Processing Device 18

As illustrated in FIGS. 5 and 6, the exhaust gas post-processing device 18 is equipped with a diesel particulate filtering device 45, a connecting pipe 48, nitrogen oxide reduction catalytic converter 47 in order from the exhaust gas upstream side of the engine 15 (hereinafter referred to simply as "upstream side"). A urea aqueous solution mixing device 46 is attached to the connecting pipe 48.

The diesel particulate filtering device 45 collects particulate matter such as soot and the like in the exhaust gas, and is mounted on the rear portion of the base plate 28 of the supporting mechanism 17. The urea aqueous solution mixing device 46 emits a urea aqueous solution sucked up by a pump that is not illustrated from a urea aqueous solution tank that is not illustrated, and adds the urea aqueous solution to the exhaust gas as a reducing agent. The added urea aqueous solution is hydrolyzed to become ammonia, and the ammonia is fed with the exhaust gas through the connecting pipe 48 to the nitrogen oxide reduction catalytic converter 47. The ammonia from the urea aqueous solution mixing device 46 is used as the reducing agent to purify by reduction the nitrogen oxides in the exhaust gas in the nitrogen oxide reduction catalytic converter 47. The nitrogen oxide reduction catalytic converter 47 is mounted on the front portion of the base plate 28 of the supporting mechanism 17 in the same way as the diesel particulate filtering device 45. The diesel particulate filtering device 45 and the nitrogen oxide reduction catalytic converter 47 are fixed to the base plate 28 via each of the separate attachment plates.

The diesel particulate filtering device 45 and the nitrogen oxide reduction catalytic converter 47 are disposed parallel to each other. Specifically, the diesel particulate filtering device 45 and the nitrogen oxide reduction catalytic converter 47 are both cylindrical and the center axes thereof are disposed so as to extend in the crosswise direction and are parallel to each other. An exhaust gas inlet 45a is provided on the left edge portion of the diesel particulate filtering device 45, and an opening of the exhaust gas inlet 45a faces toward the rear. An exhaust gas outlet 45b is provided on the right edge portion of the diesel particulate filtering device 45, and an opening of the exhaust gas outlet 45b faces toward the front. An exhaust gas inlet 47a is provided on the left edge portion of the nitrogen oxide reduction catalytic converter 47, and an opening of the exhaust gas inlet 47a faces toward the rear. An exhaust gas outlet 47b is provided on the right edge portion of the nitrogen oxide reduction catalytic converter 47, and an opening of the exhaust gas outlet 47b faces toward the rear and obliquely upward. The connecting pipe 48 is disposed between the exhaust gas outlet 45b of the diesel particulate filtering device 45 and the exhaust gas inlet 47a of the nitrogen oxide reduction catalytic converter 47.

Figure 10:
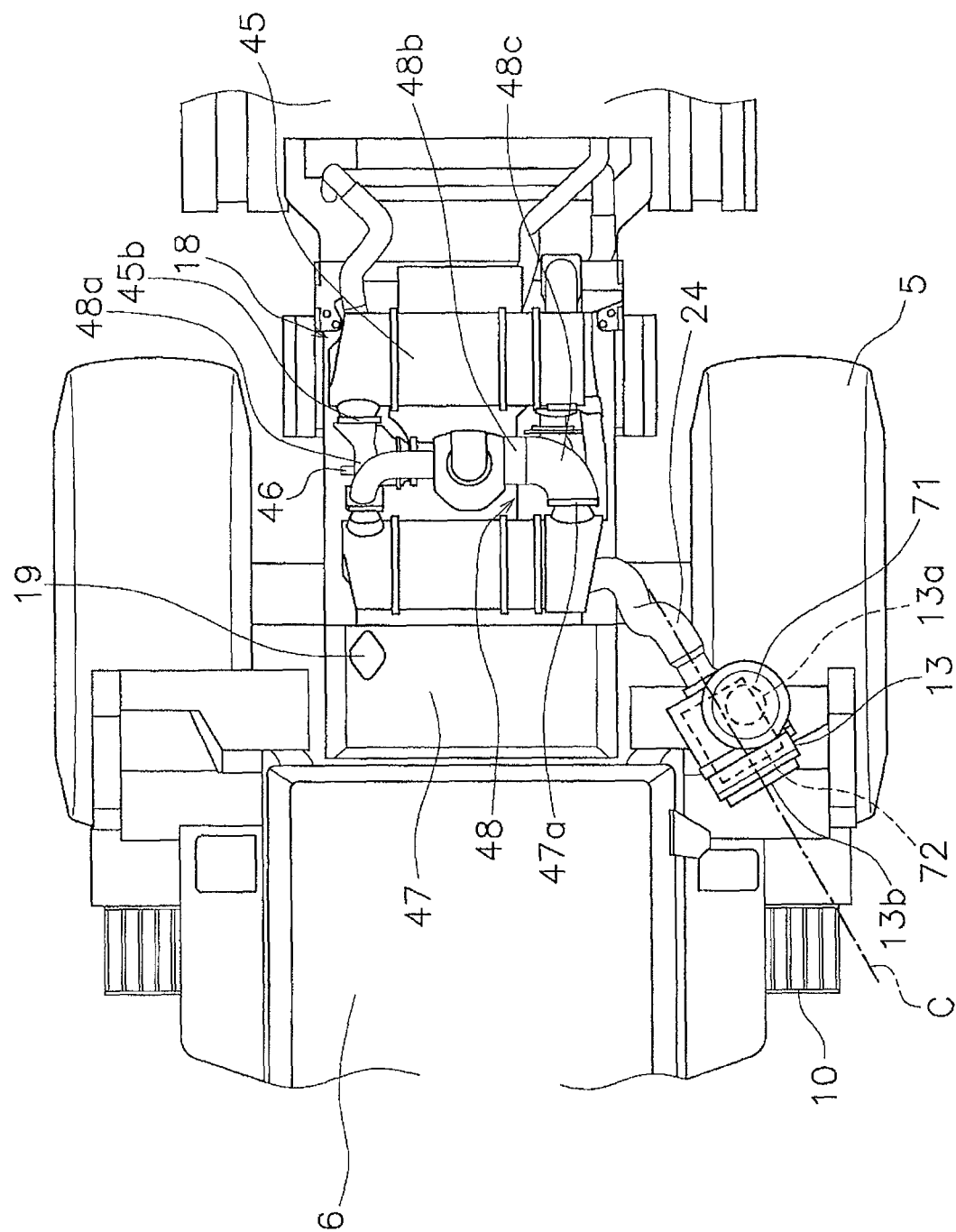
FIG. 10 is a plan view of a disposition of the air cleaner.

As illustrated in FIGS. 5 and 10, the connecting pipe 48 has a first bend section 48a, a linear section 48b, and a second bend section 48c, and the entire connecting pipe 48 forms an S shape. The first bend section 48a is located near the exhaust gas outlet 45b of the diesel particulate filtering device 45, and the second bend section 48c is located near the exhaust gas inlet 47a of the nitrogen oxide reduction catalytic converter 47. The linear section 48b is located between the first bend section 48a and the second bend section 48c and is disposed parallel to the diesel particulate filtering device 45 and the nitrogen oxide reduction catalytic converter 47.

The urea aqueous solution mixing device 46 is provided on the first bend section 48a and emits a urea aqueous solution into the connecting pipe 48. The emitted urea aqueous solution becomes evenly mixed with the exhaust gas while passing through the long linear section 48b.

The lengths in the crosswise direction of the of the diesel particulate filtering device 45 and the nitrogen oxide reduction catalytic converter 47 are formed to be longer than the width in the crosswise direction of the base plate 28.

Pipe Unit 23

Figure 8:
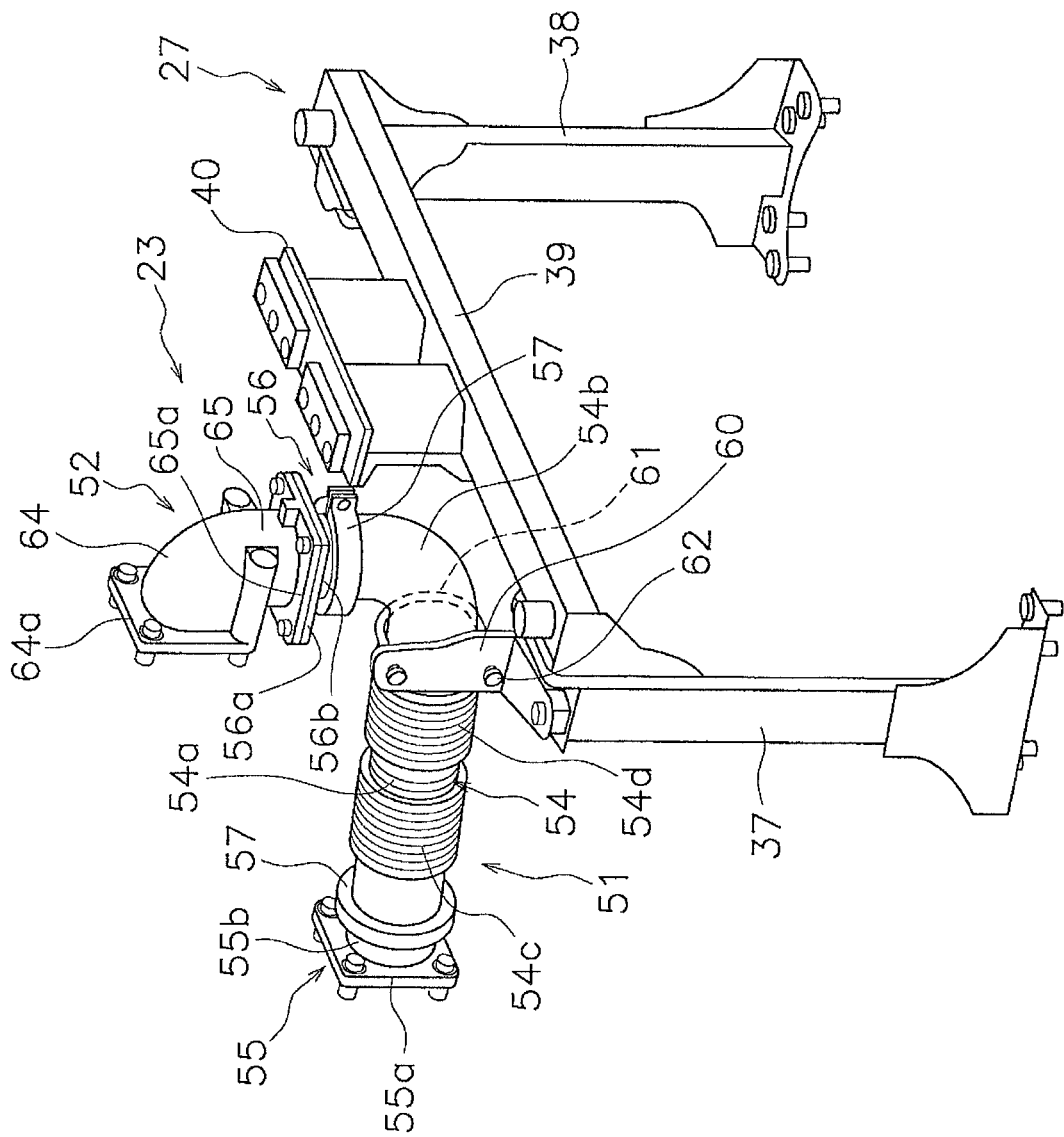
FIG. 8 is an external perspective view of a pipe unit.

FIG. 8 illustrates an enlargement of the pipe unit 23. The pipe unit 23 has an upstream side pipe 51 and a downstream side pipe 52.

The upstream side pipe 51 includes a pipe body 54, and a front flange 55 and a rear flange 56 respectively provided at either end of the pipe body 54. Spherical joints 57 are provided between the pipe body 54 and the front and rear flanges 55, 56.

The pipe body 54 is made of stainless steel and includes a linear extending section 54a that extends from the front toward the rear, and a bend section 54b that bends upward from the rear end portion of the extending section 54a. Two bellows-like flexible pipe sections 54c, 54d are formed in the extending section 54a. The front and rear flanges 55, 56 respectively include rectangular connecting end faces 55a, 56a and pipe sections 55b, 56b that respectively extend from the connecting ends 55a, 56a. The connecting end face 55a of the front flange 55 is connected to an exhaust gas outlet of the turbo charger 22. The connecting end face 56a of the rear flange 56 is connected to the downstream side pipe 52.

A spherical joint that uses the known technology disclosed in US Patent No. 2011/007415 may be used for example as the spherical joint 57.

As illustrated in FIG. 8, the upstream side pipe 51 is fixed to the left post 37 of the rear supporting frame 27 via a fixing plate 60 and a U-shaped metal fitting 61. The fixing plate 60 is L-shaped and a lower side thereof is fixed to the upper portion of the left post 37. Both ends of the U-shaped metal fitting 61 that holds the rear portion (exhaust gas downstream side) of the flexible pipe section 54d of the pipe body 54 are fixed to the standing side of the fixing plate 60 with nuts 62.

The downstream side pipe 52 is a 90-degree elbow and includes a first pipe section 64 that is connected to the diesel particulate filtering device 45, and a second pipe section 65 that is orthogonal to the first pipe section 64. The second pipe section 65 is configured by the bend section 54b of the upstream side pipe 51 and a linking section that links the lower and upper sections of the pipe unit 23.

A flange 64a is formed at the exhaust gas downstream side end of the first pipe section 64, and is connected to the exhaust gas inlet 45a of the diesel particulate filtering device 45. A flange 65a is formed at the exhaust gas upstream side end of the second pipe section 65, and is connected to the connecting end face 56a of the rear flange 56 of the upstream side pipe 51.

Figure 9:
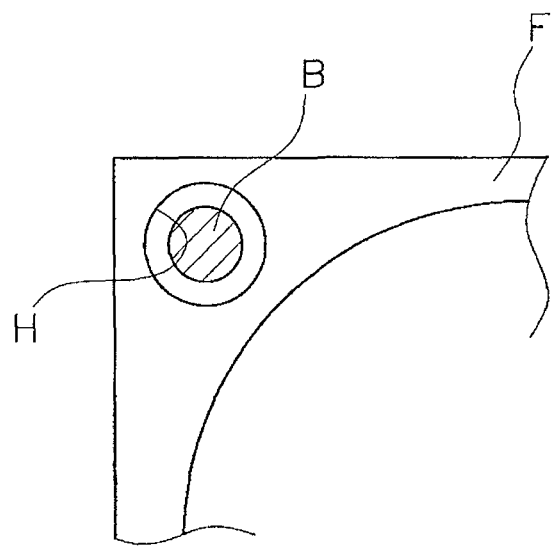
FIG. 9 is a schematic view for explaining an adjustment function of a flange connecting portion.

As schematically illustrated in FIG. 9, in the connection of a flange F (collective name for all flanges), one or two bolt through holes H of the flange F is formed to have a larger diameter than the diameter of a connecting bolt B. As a result, when mounting the exhaust gas post-processing device 18 on the base plate 28 to make a sub-unit and assembling the sub-unit with the pipe unit 23 fixed to the rear supporting frame 27, an assembly error can be absorbed even if an error exists in the positional relationship between the exhaust gas post-processing device 18 and the pipe unit 23. That is, the assembly construction of the flanges F functions as an adjusting mechanism for adjusting the assembly location.

Air Cleaner 13

The air cleaner 13 and a disposition thereof are explained with reference to FIGS. 2 and 11. The air cleaner 13 is provided outside of the engine room and on the upper portion of the rear wheel fender 5a. The rear wheel fender 5a is configured of a fender front portion 5b, and a fender rear portion 5c fastened to the fender front portion 5b. The fender front portion 5b is configured by a horizontal portion and a sloped portion that slopes forward and downward from the horizontal portion. The fender rear portion 5c is formed in an arced shape as seen from the side and covers the upper portion and the upper rear portion of the rear wheel 5. The air cleaner 13 is mounted on the horizontal portion of the fender front portion 5b.

As illustrated in FIG. 2, except for a portion thereof, the air cleaner 13 is covered by an air cleaner cover 70 that is provided on the outside of the vehicle body cover 9. FIG. 11 is a plan view of the air cleaner 13 and portions related to the air cleaner 13 with the vehicle body cover 9 and the air cleaner cover 70 removed.

Figure 11:
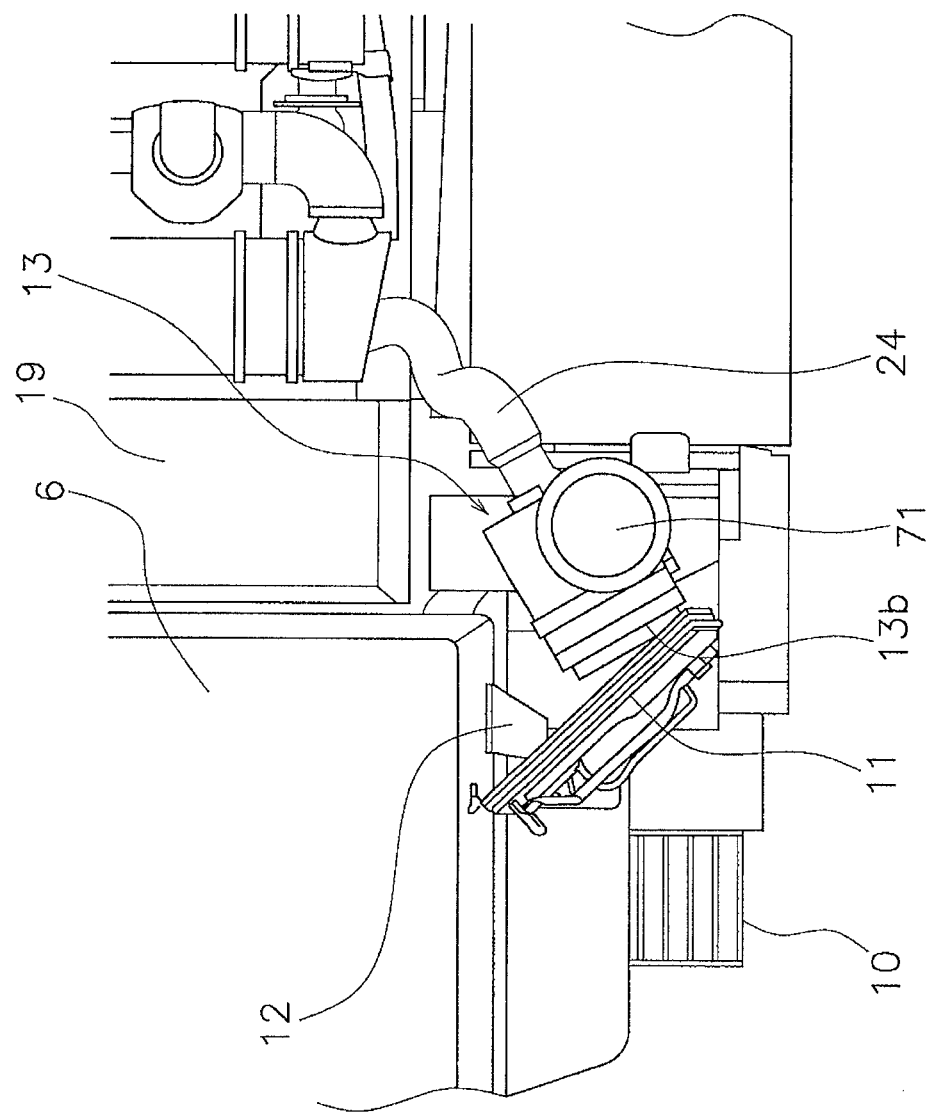
FIG. 11 illustrates a relationship between an air cleaner and the door.

As illustrated in FIGS. 2 and 11, the air cleaner 13 is cylindrical and a cap 71 that covers the air intake mouth 13a is provided on the upper portion of the air cleaner 13, and an openable and closable lid 13b is provided on the front portion of the air cleaner 13. A filter 72 is provided in an attachable and detachable manner inside the air cleaner 13. The air cleaner cover 70 covers most of the air cleaner 13 excluding the front end portion to which the air intake mouth 13a, the cap 71, and the lid 13b are attached. The filter 72 can be maintained and exchanged by opening the lid 13b and pulling the filter 72 out obliquely toward the front.

The disposition of the air cleaner 13 is explained in detail below.

As illustrated in FIG. 11, the air cleaner 13 is disposed on the upper portion of the fender front portion 5b of the rear wheel fender 5a and the lateral side of the rear of the cab 6. More specifically, the front portion of the air cleaner 13 is located to the rear of the steps 10 and beside the rear end portion of the cab 6, and the rear portion of the air cleaner 13 is located beside the front portion of the operating fluid tank 19. A center axis C of the air cleaner 13 is substantially horizontal and is slanted with respect to the center axis extending to the front and rear of the vehicle so that the front portion of the air cleaner 13 is further away from the cab 6 than the rear portion. As described above, the filter 72 can be pulled out toward the front along the center axis C.

Figure 12:
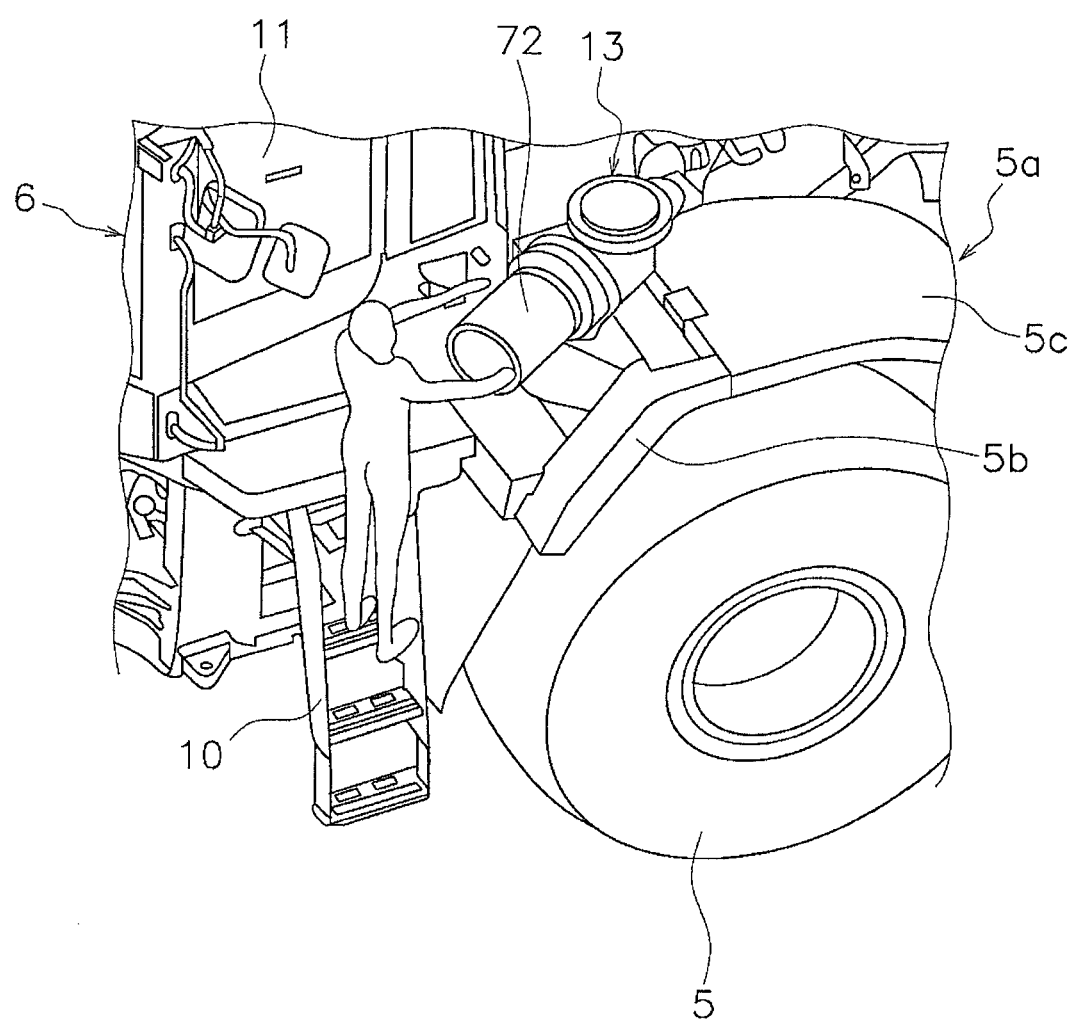
FIG. 12 illustrates an appearance of maintenance work on the air cleaner.

As described above, the stopper 12 is provided on the cab 6 to limit the maximum opening degree of the door 11, and as illustrated in FIG. 12, the front end portion of the air cleaner 13 is disposed in a location that does not obstruct the door 11 even if the door 11 is opened to the maximum to abut the stopper 12.

Due to the disposition of the air cleaner 13 as described above, the operator can stand on the steps 10 and open the lid 13b of the air cleaner 13 to easily perform maintenance or exchange work of the filter 72 as illustrated in FIG. 12.

Flow of Air and Exhaust Gas

As illustrated in FIG. 3, air is introduced from the air cleaner 13 and fed into the engine 15 through the intake pipe 24 and the turbo charger 22. Exhaust gas from the engine 15 is introduced through the pipe unit 23 into the exhaust gas post-processing device 18 after driving the turbo charger 22.

Particulate matter such as soot is collected by the diesel particulate filtering device 45 in the exhaust gas post-processing device 18. Next, the particulate matter is introduced into the urea aqueous solution mixing device 46. A urea aqueous solution is emitted into the exhaust gas to mix with the exhaust gas in the urea aqueous solution mixing device 46. Consequently, the urea aqueous solution is hydrolyzed by the heat of the exhaust gas and water vapor in the exhaust gas to become ammonia. The ammonia generated in this way is fed with the exhaust gas through the connecting pipe 48 to the nitrogen oxide reduction catalytic converter 47. The ammonia is used as the reducing agent to purify by reduction the nitrogen oxides in the exhaust gas in the nitrogen oxide reduction catalytic converter 47.

Attachment and Detachment of Exhaust Gas Post-Processing Device 18

The diesel particulate filtering device 45 is desirably removed from the vehicle at prescribed time periods for maintenance. Accordingly, the exhaust gas post-processing device 18 is made into a sub-unit with the base plate 28 to facilitate assembly and maintenance of the exhaust gas post-processing device 18. When assembling the sub-unit onto the supporting mechanism 17, the pipe unit 23 is fixed to the engine 15 and the supporting mechanism 17.

Specifically, the front flange 55 of the upstream side pipe 51 is connected to the exhaust gas outlet of the turbo charger 22, and the downstream side of the flexible pipe 54d of the pipe body 54 is fixed to the supporting mechanism 17 with the fixing plate 60 and the U-shaped metal fitting 61. When connecting the upstream side pipe 51 to the turbo charger 22, the upstream side pipe 51 and the spherical joint 57 on the exhaust gas upstream side are connected temporarily. The U-shaped metal fitting 61 is also fastened temporarily.

Next, the downstream side pipe 52 is connected to the upstream side pipe 51. The upstream side pipe 51 and the downstream side pipe 52 may be connected to each other before connecting the upstream side pipe 51 to the turbo charger 22. As described above, in this case the flanges 56 and 65a are connected to each other with the exhaust gas downstream side spherical joint 57 in a temporarily fastened state.

As described above, the sub-unit is supported by the supporting mechanism 17 in a state in which the pipe unit 23 is fixed to the engine 15 and the supporting mechanism 17 side. When assembling the sub-unit on the supporting mechanism 17, both the heights thereof are adjusted by the shim 43 and adjustments in the front-rear, vertical, and crosswise directions are performed by adjusting the assembly of the flanges 64a, 65a at both ends of the downstream side pipe 52. Further, angle adjustment of the sub-unit and the supporting mechanism 17 is performed with the spherical joints 57 at either end of the upstream side pipe 51. The shim adjustments are rarely performed during maintenance since the adjustments are performed by the manufacturer before shipping.

Since the relatively long flexible pipe sections 54c, 54d are provided in the upstream side pipe 51 of the pipe unit 23, an assembly error can be absorbed by the flexible pipe sections 54c, 54d when performing the above adjustment.

As described above, when the location of the sub-unit is adjusted appropriately with the engine 15 and the supporting mechanism 17, the temporarily fastened portions are firmly fixed and the assembly work is completed.

In the state in which the exhaust gas post-processing device 18 is assembled, the engine 15 and the transmission 20 are mounted on the vehicle body frame 2 via the rubber mounts 21, and the exhaust gas post-processing device is mounted directly onto the vehicle body frame 2 via the supporting mechanism 17. As a result, a difference arises between the vibrations from the engine 15 and the vibrations from the exhaust gas post-processing device 18 while the vehicle is being operated.

However, the difference between the two vibrations can be sufficiently absorbed since the relatively long flexible pipe sections 54c, 54d are formed in the extending section 54a of the pipe unit 23. Therefore, the vibration of the engine 15 can be suppressed.

Air Cleaner 13 Maintenance

Exchange work and cleaning of the filter 72 are desirably performed at certain time periods in the air cleaner 13. At this time the filter 72 is desirably removed from the air cleaner 13.

When removing the filter 72 from the air cleaner 13, the operator stands on the steps 10 and opens the lid 13b of the air cleaner 13 as illustrated in FIG. 13. The filter 72 of the air cleaner 13 may be pulled out toward the front along the center axis C of the air cleaner 13. At this time, since the air cleaner 13 is slanted so that the front side thereof is further away from the cab 6 than the rear side thereof, the work to remove the filter 72 is easy to perform.

Characteristics (1) Since the exhaust gas post-processing device 18 is supported by using the front supporting frame 26 that is a stand for the operating fluid tank, a mechanism for supporting the exhaust gas post-processing device 18 can be realized with a simple configuration.

(2) The front supporting frame 26 has great strength for supporting the operating fluid tank 19. By supporting the exhaust gas post-processing device 18 with the front supporting frame 26 that has great strength, the vibrations of the exhaust gas post-processing device 18 can be suppressed.

(3) Space for piping in the rear supporting frame 27 can be reduced since the spaces formed on the right and left of the rear supporting portion 40 are used as spaces for piping.

(4) The pipe unit 23 is configured by the upstream side pipe 51 and the downstream side pipe 52 configured with a 90 degree elbow and the holes in the flanges have diameters larger than bolt diameters to allow an installation error to be absorbed. As a result, installation of the pipe unit 23 and the diesel particulate filtering device 45 is facilitated and an adjustment mechanism for adjusting an installation position can be realized with a simple configuration.

(5) The flexible pipe sections 54c and 54d are provided in the upstream side pipe 51 that configures the pipe unit 23. Therefore, a difference between the vibration from the engine 15 and the vibration from the exhaust gas post-processing device 18 side can be absorbed, and the vibration from the engine 15 side can be suppressed more in comparison to when the diesel particulate filtering device is mounted on the engine as with the conventional device.

(6) The diesel particulate filtering device 45 is mounted near the rear supporting portion 40 and the nitrogen oxide reduction catalytic converter 47 is mounted near the front supporting portion 35 on the base plate 28. As a result, vibration from the diesel particulate collection and filtering device 45 and the selective reduction catalytic converter 47 can be suppressed.

(7) The shim 43 is disposed between the rear supporting portion 40 of the rear supporting frame 27 and the base plate 28 to allow for the simple adjustment of the height of the exhaust gas post-processing device 18. Therefore, the height positions of the exhaust gas inlet 45a of the diesel particulate filtering device 45 and the pipe unit 23 can be easily matched.

(8) A hole 28a for avoiding the bolt 44 for fixing the shim 43 to the rear supporting portion 40 is formed in the base plate 28. As a result, the attachment and detachment of the base plate 28 and the exhaust gas post-processing device 18 can be conducted while the shim 43 is fixed to the rear supporting portion 40, and the shim 43 does not fall from the rear supporting portion 40 during the attachment or detachment.

Other Embodiments

The present invention is not limited to the above embodiments and various changes and modifications may be made without departing from the spirit of the invention.

(a) While the diesel particulate filtering device 45 and the nitrogen oxide reduction catalytic converter 47 are mounted on the base plate 28 in the aforementioned embodiment, the present invention can also be applied when, for example, the air cleaner 13 is mounted thereon in addition to the above devices. The disposition of the diesel particulate filtering device 45 and the nitrogen oxide reduction catalytic converter 47 is not limited to the aforementioned embodiment.

(b) The specific shapes of the front supporting frame 26 and the rear supporting frame 27 that configure the supporting mechanism 17 are not limited to the aforementioned embodiment.

(c) While the adjusting mechanism for adjusting an installation error is configured with a hole in the flange, the adjusting mechanism is not limited to this configuration.

(d) The configuration of the pipe unit is not limited to the aforementioned embodiment. For example, the exhaust gas inlet of the diesel particulate filtering device may face toward the front and the pipe unit may be configured by only one pipe.

In the illustrated embodiments as described above, the vibration of the diesel particulate filtering device can be suppressed with a simple mechanism having great strength in the wheel loader of the illustrated embodiment in which the diesel particulate filtering device is disposed above the engine.

What is claimed is::

1. A wheel loader comprising:
   a vehicle frame;
   an engine mounted on the vehicle frame;
   an operating fluid tank disposed in front of the engine;
   a stand fixed to the vehicle frame and supporting the operating fluid tank;
   a rear support frame disposed facing the stand with the engine interposed therebetween and fixed to the vehicle frame;
   a base member disposed above the engine and having one end fixed to an upper part of the stand and the other end fixed to an upper part of the rear support frame; and
   a diesel particulate filtering device, a nitrogen oxide reduction catalytic converter, and a connecting pipe, all mounted on the base member with the connecting pipe connecting the diesel particulate filtering device and the nitrogen oxide reduction catalytic converter.

2. The wheel loader according to claim 1, wherein the rear support frame includes
   left and right posts disposed facing each other in a crosswise direction of the vehicle,
   an upper brace extending in the crosswise direction of the vehicle and having both ends thereof fixed to upper parts of the left and right posts, and
   a rear supporting part that is provided so as to project upward in a middle portion in the crosswise direction of the upper brace, and that supports a rear end part of the base member,
   a space for disposing members being secured above the upper brace to the left and right of the rear supporting part.

3. The wheel loader according to claim 2, further comprising:
   a pipe unit connected between an exhaust part of the engine and an exhaust gas inlet of the diesel particulate filtering device; and
   an adjusting mechanism for adjusting an assembly position of the pipe unit and the diesel particulate filtering device mounted on the base member, the base member being removable from the stand and from the rear support frame.

4. The wheel loader according to claim 3, wherein the pipe unit includes
   an upstream side pipe having an exhaust upstream side end part coupled to the exhaust part of the engine, and an exhaust
   downstream side that extends rearward from the exhaust upstream side end part and is formed to bend upward so that an end part of the exhaust downstream side opens upward, and
   a downstream side pipe having a first pipe section that is connected to the exhaust gas inlet of the diesel particulate filtering device, and a second pipe section having a certain angle with respect to the first pipe section and coupled to a rear end surface of the upstream side pipe.

5. The wheel loader according to claim 4, wherein the upstream side pipe has a flexible pipe section.

6. The wheel loader according to claim 3, wherein
   the stand includes a mounting surface on which the operating fluid tank is mounted, and a front supporting part that projects upward in the middle portion in the crosswise direction of the vehicle at a rear end part of the mounting surface and that supports the base member,
   the diesel particulate filtering device and the nitrogen oxide reduction catalytic converter are disposed in a row, and
   one of the diesel particulate filtering device and the nitrogen oxide reduction catalytic converter is supported on a front end part of the base member, and the other of the diesel particulate filtering device and the nitrogen oxide reduction catalytic converter is supported on the rear end part of the base member.

7. The wheel loader according to claim 6, wherein
   the exhaust gas inlet of the diesel particulate filtering device is formed to face toward rearward, and
   the pipe unit is disposed so as to pass through the space for disposing members.

8. The wheel loader according claim 2, further comprising
   a shim for adjusting a disposed height between the base member and the rear supporting part of the rear support frame.

9. The wheel loader according to claim 8, wherein
   the base member has an opening for avoiding obstruction with a fixing member for fixing the shim to the rear supporting part.

* * * * *